March 10, 1925.

H. A. HILLS

OIL DISTILLING PROCESS

Filed Dec. 18, 1920

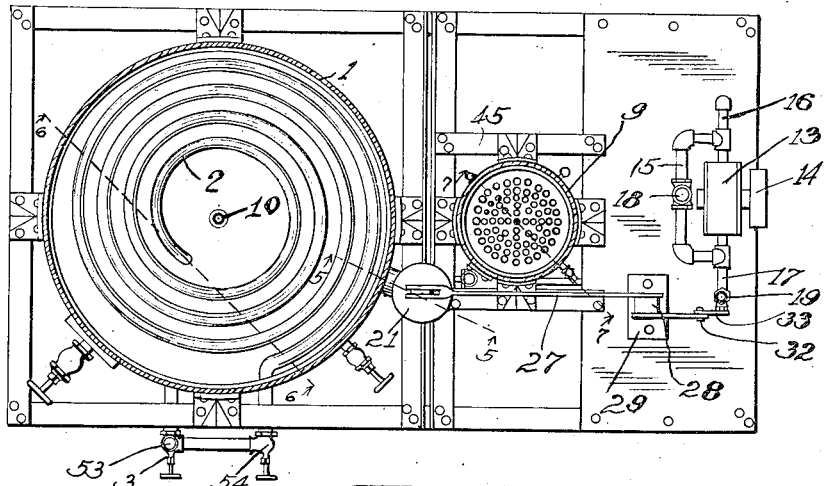
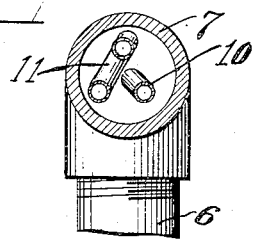
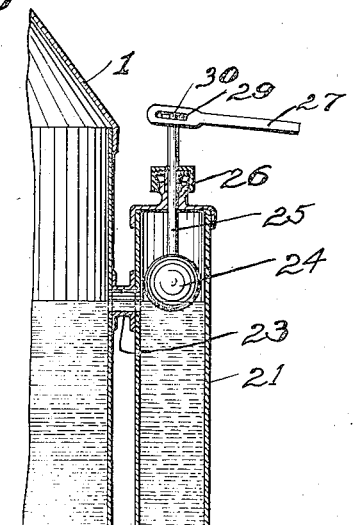
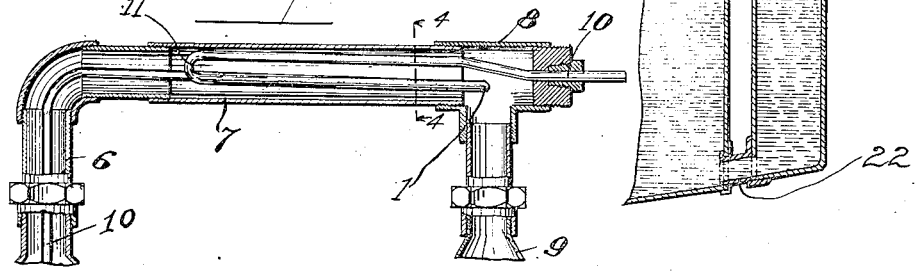

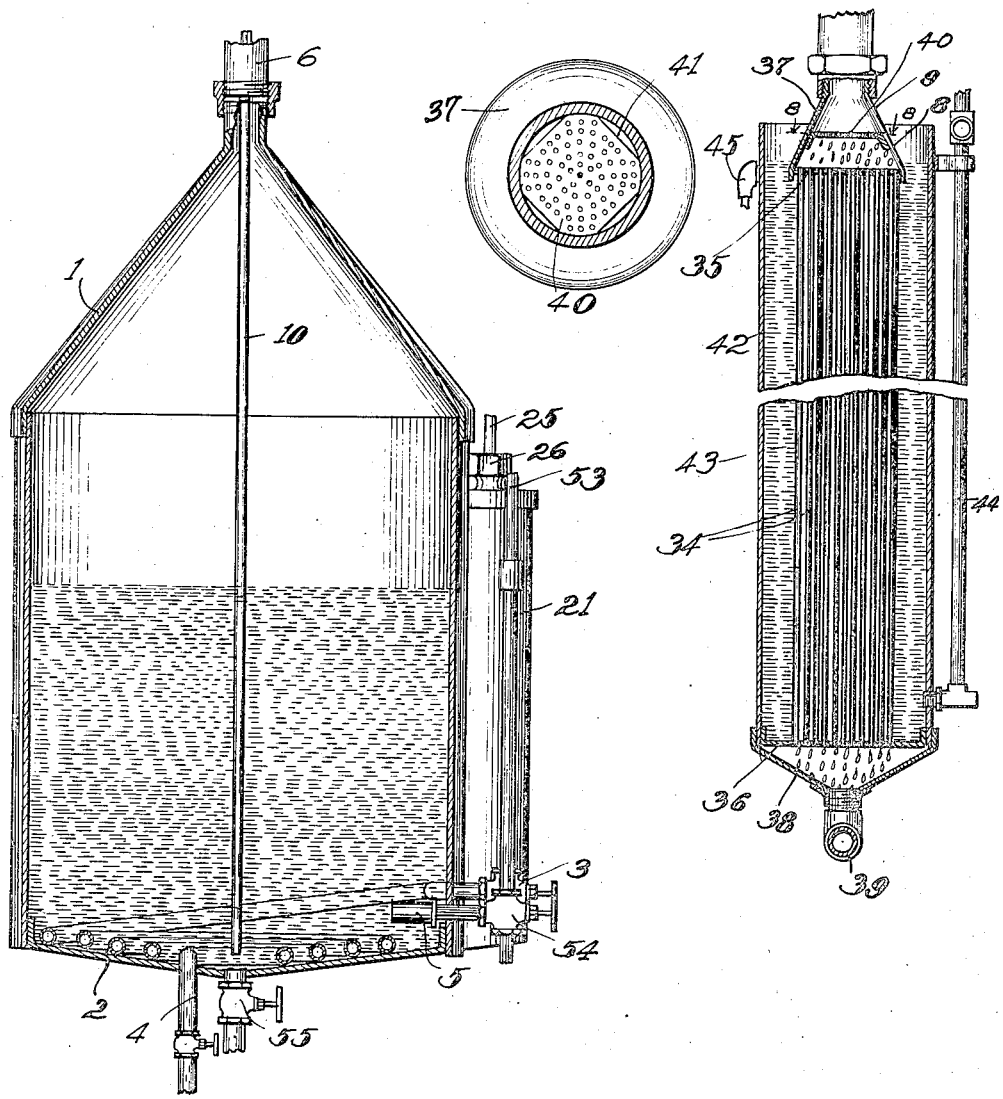

Patented Mar. 10, 1925.

1,529,067

UNITED STATES PATENT OFFICE.

HENRY A. HILLS, OF GRAND RAPIDS, MICHIGAN.

OIL-DISTILLING PROCESS.

Application filed December 18, 1920. Serial No. 431,754.

*To all whom it may concern:*

Be it known that I, HENRY A. HILLS, a citizen of the United States, and a resident of the city of Grand Rapids, in the county of Kent and State of Michigan, have invented certain new and useful Improvements in an Oil-Distilling Process; and I do hereby declare that the following is a full, clear, and exact description of the same, reference being had to the accompanying drawings, and to the numerals of reference marked thereon, which form a part of this specification.

This invention relates to stills, more particularly for purifying cleaning fluids such as gasoline or the like.

In distilling liquids it is customary to preheat the liquid by the vapors given off from the still to save fuel. In gasoline stills it has been customary heretofore to pass the vapors through pipes arranged within a tank for the gasoline to be preheated. Now, the heating of the gasoline causes a part of the grease and other material in solution or suspension to separate out with the result that a greasy deposit forms over the vapor pipes and on the walls of the tank interfering with the flow of liquid and the transfer of heat from the vapor to the liquid.

Further, when gasoline containing considerable quantities of impurities is distilled in a still of ordinary construction, foaming takes place which results in mechanically carrying over into the condenser the impurities which rise to the surface of the liquid in the form of scum and which form the envelope around the bubbles in the froth or foam produced. I have found that foaming may be avoided by agitating the fluid in the still sufficiently violently to prevent the accumulation of scum on the surface. For this purpose the fluid is preferably agitated in a vertical plane so that any scum on the surface is drawn down and mixed with the body of the fluid. This agitation not only prevents foaming, but also by preventing the formation of a layer of scum aids the vaporization of the fluid by continually presenting fresh surfaces of fluid to the vapor space thereabove.

While the vertical circulation of liquid in the still prevents foaming it also prevents a float being arranged within the still itself to control the admission of liquid to maintain a constant amount of fluid in the still.

I have also found that a steam driven pump will not give satisfactory results with gasoline and that a rotary or other form of belt or shaft driven pump gives much greater satisfaction. When, however, a belt or shaft driven pump is employed, its speed cannot be readily controlled by means of a device operated by the level of the liquid in the still. Accordingly, other means should be provided for controlling the quantity of fluid delivered by the pump.

One of the principal objects, therefore, of the present invention is to provide means for preheating the fluid to be distilled without causing the deposit of grease and the like on the heating and other surfaces.

Another object of the invention is to provide means for maintaining a constant volume of liquid in a still whose contents are subjected to violent agitation.

A further object of the invention is to provide means for controlling the volume of liquid delivered by a pump driven at constant speed.

Other and further important objects of this invention will be apparent from the disclosures in the drawings and specification.

The invention (in a preferred form) is illustrated in the drawings and hereinafter more fully described.

On the drawings Figure 1 is a side elevation of a still embodying the features of the present invention.

Figure 2 is a section on the line 2—2 of Figure 1.

Figure 3 is a vertical axial section through the pipe leading from the still to the condenser.

Figure 4 is a section on the line 4—4 of Figure 3.

Figure 5 is a section on the line 5—5 of Figure 2.

Figure 6 is a section on the line 6—6 of Figure 2.

Figure 7 is a section on the line 7—7 of Figure 2.

Figure 8 is a section on the line 8—8 of Figure 7.

Figure 1:
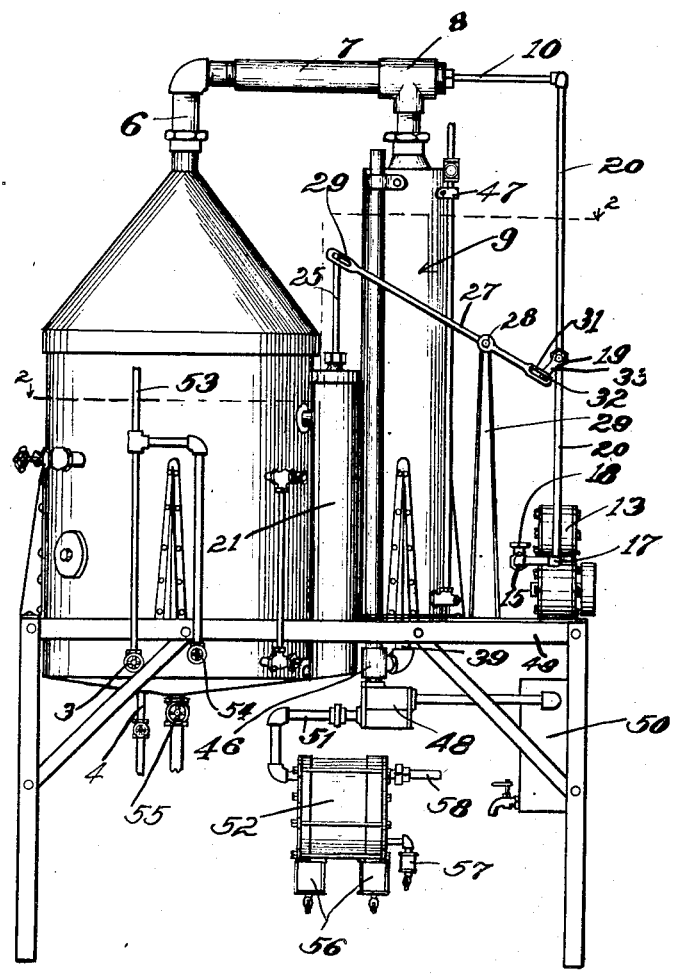

As shown on the drawings the apparatus comprises a still 1 provided in its lower portion with a coil of pipes 2 through which steam may be supplied through a valve 3 from a supply pipe 53 and discharged therefrom by a pipe 4. This coil provides the necessary heat for the vaporization of gasoline or other cleaning fluid within the still. Since the mere heating of a body of gasoline containing grease and other impurities in solution or in suspension causes a scum to form at the surface, which results in the production of foam which carries the impurities mechanically into the condenser, means are provided for violently agitating the liquid in the still, preferably the agitating means should be adapted to cause a circulation of the liquid in a vertical plane so that any scum on the surface of the liquid in the still is drawn down and mixed with the body of the fluid. Such agitation may conveniently be produced by a steam nozzle 5 fully described in my co-pending application, Serial No. 115,634, filed August 18, 1916. As it forms no part of the present invention it need not be further described here. Steam is supplied to the nozzle through pipe 53 and valve 54. The vapor produced in the still passes off through a pipe 6 of comparatively large diameter, connected at its upper end to horizontal pipe 7. To the other end of this pipe is connected a T-piece 8 one arm of which is connected to the upper part of a condenser 9. Through the other arm of the T-piece is passed a small pipe 10 through which the gasoline to be distilled is passed. This pipe 10 is bent on itself at 11 and 12 as shown in Figure 3 so as to increase the length of the pipe within the pipe 7 and thereby aid in the transferring of heat thereto from the hot vapor passing through the pipe 7 from the still to the condenser, so that the liquid passing through the pipe 10 may be adequately preheated. The pipe 10 then passes through the pipe 6 and extends downwardly through the still to a point adjacent the bottom thereof, thus causing the gasoline to be preheated while flowing through this small pipe surrounded by vapor of gasoline. The gasoline, as it is preheated, flows at a relatively high speed over the heated surfaces so that it has no opportunity to deposit grease and other material upon the wall of the tube. In the previous forms of preheating devices the vapor of gasoline was passed through small pipes in a large container for the gasoline so that the velocity of movement of the gasoline over the heated surfaces was relatively slight with the result that a deposit on the pipes formed very easily. By increasing the speed at which the gasoline is passed over the heating surfaces, the deposit of grease and the like thereon is avoided. The grease and impurities collecting in the still may be drawn off from time to time through the valve 55.

Gasoline is fed to the pipe 10 by means of a pump 13. This pump 13 should be preferably mechanically driven as distinguished from steam operated since I have found that such pumps operate much more satisfactorily on gasoline than do steam pumps. Consequently I prefer to employ a rotary form of pump driven by a pulley 14, as shown. While it is easy to regulate the amount of liquid delivered by a steam pump by controlling the amount of steam delivered to the pump, the control of the fluid given by a mechanically operated and consequently constant speed pump is not so simple. Accordingly, I provide a bypass 15 between the intake pipe 16 and the outlet pipe 17 of the pump. In the bypass I have arranged a spring held check valve 18 which allows fluid to flow from the pipe 17 to the pipe 16 whenever the pressure in the pipe 17 exceeds a predetermined value, but which prevents at all times the flowing of liquid in the reverse direction. By providing means for controlling the opening of valve 19 in the pipe 20 which connects the outlet pipe 17 of the pump to the plate 10 by which the gasoline is discharged into the still, the amount of gasoline which flows into the still may be regulated and any gasoline which is forced through the pump in excess of that (from valve 19) which the valve 19 will allow to flow into the still passes through the bypass 15 back into the pump.

The flow of gasoline into the still is preferably controlled by the level of gasoline within the still so that the volume of liquid within the still is always maintained constant. In view, however, of the violent agitation within the still, I have found that a float placed in the still itself oscillates so violently as a result of the agitation in the still that it will not give satisfactory results. Accordingly, I have provided an auxiliary float chamber 21 at one side of the still and connected thereto at its upper and lower ends by means of pipes 22 and 23. The liquid in this chamber 21, not being subject to the violent agitation of the still, maintains a fairly constant level. Within this chamber is arranged a float 24 which may conveniently take the form of a copper ball secured to rod 25 slidable vertically through the stuffing box 26. Movement of the float 24 within the chamber 21 may be transmitted to the valve 19 by means of a rocker arm 27 pivotally mounted at 28 on a standard 29, one end of this arm 27 being formed with a slot 29 for engagement with a pin 30 attached to the upper end of the rod 25. The opposite end of the rocker arm 27 is slotted at 31 for engagement with pin 32 on the arm 33 by which the valve 19 is rotated. The construction of the condenser is shown more particularly in Figures 7 and 8. The condenser comprises a series of tubes 34 secured to perforated lids 35 and 36 at their upper and lower ends respectively. Conical caps 37 and 38 respectively serve to direct gasoline vapor through the tubes and lead the condensed gasoline from the tubes to an outlet pipe or discharge pipe 39. In the conical head 37 of the still a perforated plate 40 may be arranged for the purpose of breaking up the flow of the gasoline so that it flows through the tubes 34 substantially uniformly instead of flowing through the central tube to the exclusion of the outer tubes. To further aid the gasoline vapor in passing through the outer tubes, portions of the periphery of plate 40 are cut away at 41 to provide open spaces around the plate through which the vapor of gasoline may readily flow. The vapor of gasoline flowing around the plate 40 will naturally find its way into the outer tubes 34 so that the flow of the vapor through the tubes 34 is thereby equalized. Between the flanges on the conical bottom 38 and the plate 36 is clamped the lower edge of cylinder 42 adapted to be supplied with water 43 from pipe 44 connected to the bottom of the cylinder 42. Heated water from the upper part of the cylinder 42 is carried away by pipe 45. The liquid gasoline which contains considerable quantities of water in view of the steam which is injected into the still through the nozzle 5 passes from the outlet pipe 39 of the condenser through a T piece 46 having one end connected to vent pipe 47 open to the atmosphere at its upper end, while the other arm is connected to a separator 48. In this separator the larger part of the gasoline flows to the surface in view of its lower specific gravity and may be drawn off therefrom by pipe 49 into a storage tank 50. The water which settles to the bottom of the separator 48 containing considerable quantities of gasoline in suspension is drawn off by pipe 51 into a filter 52 in which are arranged layers of filtering material which are pervious to gasoline but impervious to water. Such a filter may be made by treating a closely woven material such as canton flannel with kerosene mixed with oil of citronella. The construction of the filter itself has, however, been fully set forth in my co-pending application Serial No. 111,907, filed July 28, 1916, so that further disclosure here is unnecessary. The water separating out is discharged through the sight tubes 56 and in some cases sight tube 57 while the gasoline is discharged through the sight tube 58.

The operation is as follows: The pump 13 is thrown into operation to fill the still to the required level. As soon as this has been accomplished, the float 24 rises in the chamber 21 and thereby closes the valve 19 through the intermediary of the rod 25, pin 30, rocker arm 27, pin 32 and arm 33. Steam may then be passed through the coil 2 and simultaneously introduced into the liquid in the still through the nozzle 5 to produce the desired violent agitation in the still to avoid the formation of froth within the still. The vapor of gasoline then passes off through the pipes 6 and 7 to the condenser 9. On its way it passes around the pipe 10 and thereby heats the gasoline forced therethrough by means of the pump 13. In operation the level of liquid in the still automatically regulates itself so that the float is maintained in such a position that the valve 19 is open just far enough to allow a flow of gasoline therethrough in quantities just equivalent to the gasoline just delivered to the condenser as vapor. The vapor of gasoline entering the condenser 9 strikes the central portion of the deflecting or distributing plate 40 and part flows through the apertures therein while the other part flows around the plate by virtue of the cut-away parts 41 therein. A part of the gasoline and steam is condensed at this point, as the whole condenser is kept cool by the water 33 therein. The greater part of the vapor, however, enters the tubes 34 and is condensed before it reaches the conical bottom 38 of the condenser. In this condenser both the steam admitted through nozzle 5 and also the vapor of gasoline are condensed and flow out through the pipe 39 to the separator 48 where the greater part of the gasoline is separated from the water and passed through the tank 50. The water and any gasoline which fails to separate out in the separator 48 passes to the filter 52 where the final separation occurs. The impurities separating out in the still are drawn off from time to time through the valve 55.

I am aware that numerous details of construction may be varied through a wide range without departing from the principles of this invention, and I therefore do not purpose limiting the patent granted otherwise than necessitated by the prior art.

Claim—

A process for distilling gasoline containing grease and suspended matter to remove the same, which consists in first passing the gasoline at high speed over a surface heated by the vapors of distillation, subsequently introducing the fluid so heated into the source of vapor distillation, and finally condensing the vapors of distillation.

In testimony whereof I have hereunto subscribed my name in the presence of two subscribing witnesses.

HENRY A. HILLS.

Witnesses:
 LOUIS V. MIDDLETON,
 IVAN WELLS.